(12) United States Patent
Berkland et al.

(10) Patent No.: US 7,644,764 B2
(45) Date of Patent: Jan. 12, 2010

(54) POLYELECTROLYTE COMPLEXES AS DELAYED GELLING AGENTS FOR OIL AND GAS APPLICATIONS

(75) Inventors: Cory Berkland, Lawrence, KS (US); Mary Cordova, Cumana (VE); Jenn-Tai Liang, Lawrence, KS (US); G. Paul Willhite, Lawrence, KS (US)

(73) Assignee: University of Kansas, Lawrence, KS (US)

( * ) Notice: Subject to any disclaimer, the term of this patent is extended or adjusted under 35 U.S.C. 154(b) by 1 day.

(21) Appl. No.: 11/847,833

(22) Filed: Aug. 30, 2007

(65) Prior Publication Data

US 2008/0223578 A1 Sep. 18, 2008

Related U.S. Application Data

(60) Provisional application No. 60/906,455, filed on Mar. 12, 2007.

(51) Int. Cl.
*E21B 33/138* (2006.01)
*C09K 8/512* (2006.01)

(52) U.S. Cl. .................. 166/300; 166/294; 507/219; 507/225

(58) Field of Classification Search ............ None
See application file for complete search history.

(56) References Cited

U.S. PATENT DOCUMENTS

| 4,773,481 | A | 9/1988 | Allison et al. |
| 6,103,772 | A * | 8/2000 | Sydansk ............ 516/18 |
| 6,196,317 | B1 | 3/2001 | Hardy |
| 6,387,986 | B1 | 5/2002 | Moradi-Araghi et al. |
| 6,726,934 | B1 | 4/2004 | Prokop |
| 2004/0224024 | A1 | 11/2004 | Kamiya et al. |
| 2004/0265603 | A1 | 12/2004 | Schlenoff |
| 2005/0266090 | A1 | 12/2005 | Prokop et al. |
| 2008/0058229 | A1* | 3/2008 | Berkland et al. ......... 507/211 |
| 2008/0269083 | A1* | 10/2008 | Argillier et al. ......... 507/219 |

OTHER PUBLICATIONS

Article—Tiyaboonchai, W. et al., *Formulation and Characterization of Amphotericin B-Polyethylenimine-Dextran Sulfate Nanoparticles*, Journal of Pharmaceutical Sciences 90, 902-914 (2001) [abstract].
Article—Tiyaboonchai, W. et al., *Insulin containing Polyethylenimine-dextran sulfate nanoparticles*, International Journal of Pharmaceutics 225, 139-151 (2003) [abstact].

* cited by examiner

*Primary Examiner*—Zakiya W. Bates
(74) *Attorney, Agent, or Firm*—Stinson Morrison Hecker LLP

(57) ABSTRACT

A gel-forming composition for reducing the permeability of a subterranean formation or zone comprising a water soluble polymer (e.g., Alcoflood® 935) and a polyelectrolyte gelling agent comprising a polycation (e.g., polyalkylene imine) and a polyanion (e.g., dextran sulfate) is provided. The gel-forming composition is used to delay gelation in the subterranean formation.

28 Claims, 3 Drawing Sheets

Experiment G

POLYELECTROLYTE COMPLEXES AS DELAYED GELLING AGENTS FOR OIL AND GAS APPLICATIONS

CROSS-REFERENCE TO RELATED APPLICATIONS

This application is based on and claims priority to U.S. Provisional Application Ser. No. 60/906,455, filed on Mar. 12, 2007 which is hereby incorporated herein by reference.

STATEMENT REGARDING FEDERALLY SPONSORED RESEARCH OR DEVELOPMENT

Not applicable.

BACKGROUND OF THE INVENTION

1. Field of the Invention

This present invention relates to compositions and processes for oil and gas field applications. More specifically, this invention relates to compositions useful for controlling and/or delaying the gelation of an aqueous composition in a subterranean zone.

2. Description of Related Art

It is well known to those skilled in the art that certain polymers and other compounds are useful in oil and gas field operations. Such oil and gas field chemicals include gel-forming or cross-linking agents.

Allison et al., U.S. Pat. No. 4,773,481 describes a process for reducing the permeability of a subterranean formation by the cross-linking of water soluble polymers of polyalkylene imines and polyalkylenepolyamines with certain polymers which are anionic or hydrolyzable to form anionic polymers. Examples of the anionic polymers are polyacrylamide and alkylpolyacrylamides, copolymers of polyacrylamide and alkylpolyacrylamides with ethylene, propylene and styrene, polymaleic anhydride, and polymethylacrylate and hydrolysis products thereof. As described in the patent, when the water-soluble polymer and the anionic polymer are mixed, a viscous gel is quickly formed. Hardy, U.S. Pat. No. 6,196,317 teaches the use of a metal ion (e.g., zirconium) as a chelator to decrease the gel time.

Thus, there are continuing needs for improved methods and compositions for reducing the permeabilities of subterranean zones using water soluble polymeric components whereby the cross-linking of the components is effectively and simply controlled. In the present invention, a polyelectrolyte complex is used as a gelling agent, but the time for gelation is desirably delayed for a period of time. To date, polyelectrolytes have largely been used in the pharmaceutical industry to improve drug delivery. See, e.g., Prokop et al., U.S. Pat. No. 6,726,934 entitled Micro-particulate and nanoparticulate polymeric delivery system; Tiyaboonchai et al., *Formulation and Characterization of Amphotericin B-polyethylenimine-dextran sulfate nanoparticles*, Int'l Journal of Pharmaceutics, 90, 902-914 (2001); Tiyaboonchai et al., *Insulin containing polyethylenimine-dextran sulfate nanoparticles*, Int'l Journal of Pharmaceutics, 225, 139-151 (2003). The present invention is the directed to the new use of such polyelectrolyte complexes as controlled or delayed gelling agents.

BRIEF SUMMARY OF THE INVENTION

The present invention is directed to a novel composition for controlling and delaying gelation in a subterranean zone. The composition comprises a polyelectrolyte gelling agent comprising a polyanion complexed with a polycation and a water soluble polymer capable of being cross-linked by the polyelectrolyte gelling agent. The polyelectrolyte complex forms a particle having dimensions in the nanoparticle range. In an exemplary aspect, a polyelectrolyte gelling agent comprising the polycation polyethylene imine ("PEI") and the polyanion dextran sulfate ("DS") is mixed with a poly(acrylamide-co-acrylic acid), a water soluble polymer, commercially available as Alcoflood® 935 and the composition slowly forms a gel over several days. The PEI slowly dissociates from the polyelectrolyte complex, and then cross-links the Alcoflood® 935. The gelation typically occurs after 7, 8, 9, 10, 11, 12 or more days.

Methods for forming the polyelectrolyte complexes of the present invention are also provided. In general, the polyanion and polycation are mixed together in solution and form nanoparticles. The nanoparticles may be isolated using dialysis or other techniques known to those skilled in the art.

The compositions of the present invention are useful for controlling or delaying the gelation of aqueous solutions in a subterranean zone, for example, an oil or gas well. Various techniques for injecting liquids and slurries into such wells are known in the art and can be utilized for injection of the compositions of the present invention.

Additional aspects of the invention, together with the advantages and novel features appurtenant thereto, will be set forth in part in the description that follows, and in part will become apparent to those skilled in the art upon examination of the following, or may be learned from the practice of the invention. The objects and advantages of the invention may be realized and attained by means of the instrumentalities and combinations particularly pointed out in the appended claims.

Figure 1:
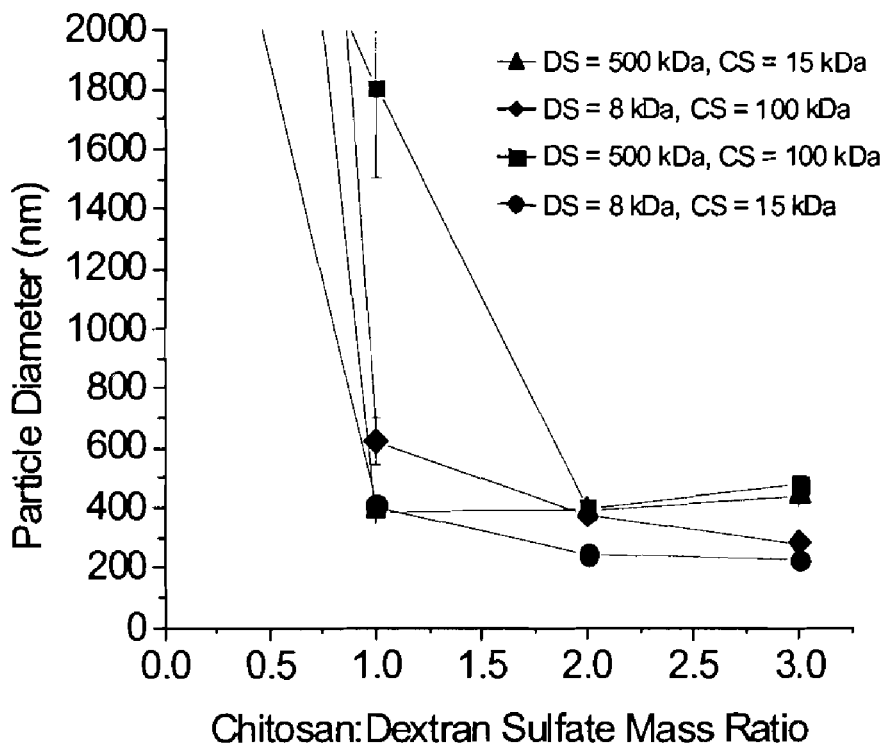
FIG. 1 shows that varying the mass ratio of dextran sulfate ("DS") to chitosan ("CS") allows control of (A) particle size and (B) zeta potential depending on the molecular mass of polyelectrolytes used (see legends). Large precipitates form as the mass ratio (CS:DS) approaches 0.2. Nanometer size range is emphasized in (A).
Figure 1:
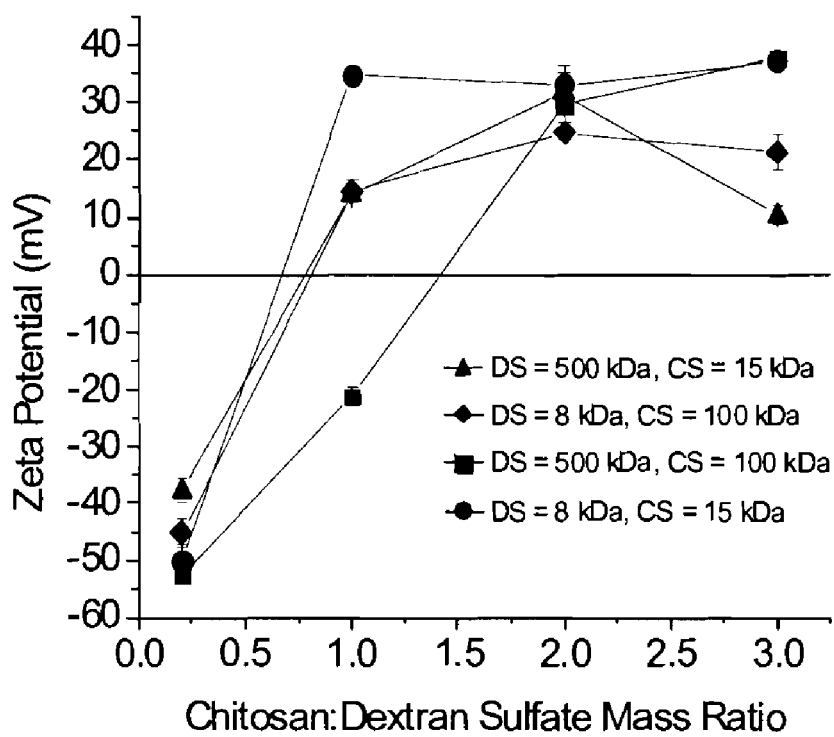

So that the matter in which the above-recited features, advantages and objects of the invention, as well as others which will become clear, are attained and can be understood in detail, more particular descriptions of the invention briefly summarized above may be had by reference to certain embodiments thereof which are illustrated in the appended drawings. These drawings form a part of the specification. It is to be noted, however, that the appended drawings illustrate preferred embodiments of the invention and therefore are not to be considered limiting in their scope.

DETAILED DESCRIPTION OF PREFERRED EMBODIMENT

Terms, when used in this application, have their common meaning unless otherwise specified. It should be noted that the alphabetical letters used in the formulas of the present invention should be interpreted as the functional groups, moieties, or substituents as defined herein. Unless otherwise defined, the symbols will have their ordinary and customary meaning to those skilled in the art.

The term "nanoparticle" shall refer to particle, preferably less than about 5000 nanometers in size, even more preferably less than 2000 nanometers in size, and still more preferably less than 100 nanometers in size. In one aspect, the size of the nanoparticle ranges from about 50 to 500 nm, and is preferably between about 100 to 300 nm.

The term "polyelectrolyte" refers to a macromolecule, usually a polymer, possessing more than one charge. The term "polyelectrolyte" includes polycations and polyanions.

The term "polymer" refers to a molecule built up by repetitive bonding together of smaller units called monomers. In this application, the term polymer includes both oligomers that have two to about 80 monomers and polymers having more than 80 monomers. The polymer can be linear, branched network, star, comb, or ladder types of polymer. The polymer can be a homopolymer in which a single monomer is used or can be copolymer in which two or more monomers are used. Types of copolymers include alternating, random, block, and graft. In general, a "random copolymer" contains a random arrangement of the multiple monomers, a "block copolymer" contains blocks of monomers of the same type, and a "graft copolymer" contains a main chain polymer consisting of one type of monomer with branches made up of other monomers.

The term "polycation" refers to a polyelectrolyte possessing net positive charge. While the polycation can contain monomer units that are charge positive, charge neutral, or charge negative, the net charge of the polymer is positive.

The term "polyanion" refers to a polyelectrolyte containing a net negative charge. While the polyanion can contain monomer units that are charge negative, charge neutral, or charge positive, the net charge on the polymer is negative.

The term "polymeric core" shall refer to the inner part of the polyelectrolyte complex.

The term "polymeric shell" or "corona" refers to the outer layer of polyelectrolyte complex.

The term "complex" means the interaction between two molecules or portions of the same molecule through noncovalent interactions such as coordination bonds, electrostatic interactions, hydrogen bonding interactions, and hydrophobic interactions.

The present invention is directed to a composition useful for reducing the permeability of subterranean zones in oil and gas field applications. The composition comprises a gelling agent which is a polyelectrolyte complex and a water soluble polymer that is capable of being cross-linked with the polyanion or polycation of the polyelectrolyte complex. In one aspect, a polycation from the polyelectrolyte complex is capable of being cross-linked with a water soluble polymer, such as Alcoflood. In another aspect, the polyanion from the polyelectrolyte complex is capable of being cross-linked with a water soluble polymer.

The water in the compositions can be water from any source so long as it does not adversely react with other components of the compositions. Generally, the water can be fresh water, water containing various amounts of one or more salts, brine produced from subterranean formations, or seawater.

In one aspect, the polyelectrolytes of the present invention form a complex that is characterized as a nanoparticle. In some instances, it is theorized that the nanoparticles comprise a polymeric core and a polymeric shell that are opposite in charge. For example, a polyanionic core may be covered by a polycationic shell or corona. It will be appreciated that the nanoparticle may alternatively comprise a polycationic core and a polyanionic shell or corona.

In an additional aspect, the present invention includes a composition comprising one or more polyelectrolytes and one or more charged polymeric surface modifiers (electrostatic stabilizers), the latter being incorporated in one step together with other polymeric components as an integral part of the complex. Similarly, a nonionic polymeric surface modifier (steric stabilizer) may be integrated into the polymer structure via an entrapment. Both classes of surface modifiers may be included to prevent particle aggregation.

The nanoparticles may further include various low molecular weight ions, e.g., cations or anions. For example, calcium ions can be complexed with the polyanions. As another example, triphosphate ions can be complexed with the polycations. Typically, the ions are present in an amount up to about 5.0 wt-%. Furthermore, such nanoparticles may comprise a monovalent or bivalent inorganic salt, such as sodium chloride, calcium chloride, or sodium sulfate. The addition of such ions may increase the stability of the nanoparticles and results in, inter alia, increased entrapment efficiency for a more efficacious delivery of an oil and gas field chemical.

As alluded to above, it will be appreciated to those skilled in the art that the charges on the polyelectrolytes may be arranged in a spatially regular or irregular manner. Further, the polyelectrolytes may be synthetic (synthetic polyelectrolytes), naturally occurring (such as proteins, enzymes, polynucleic acids), or synthetically modified naturally occurring macromolecules (such as modified celluloses and lignins).

The charges on a polyelectrolyte may be derived directly from the monomer units or they may be introduced by chemical reactions on a precursor polymer. For example, poly(diallyidimethylammonium chloride) ("PDAD") is made by polymerizing diallyidimethylammonium chloride, a positively charged water soluble vinyl monomer. The positively-charged copolymer PDAD-co-PAC (i.e., poly(diallyidimethylammonium chloride) and polyacrylamide copolymer) is made by the polymerization of diallyidimethylammonium chloride and acrylamide (a neutral monomer that remains neutral in the polymer). Poly(styrenesulfonic acid) is often made by the sulfonation of neutral polystyrene. Poly(styrenesulfonic acid) can also be made by polymerizing the negatively charged styrene sulfonate monomer.

Various polyelectrolytes comprising polyanions are known in the art. Weak polyanions typically include carboxylic acid groups while strong polyanions typically include sulfonic acid groups, phosphonic acid groups, or sulfate groups. Examples of a negatively-charged polyelectrolyte include polyelectrolytes comprising a sulfonate group (—$SO_3$), such as poly(styrenesulfonic acid) ("PSS"), poly(2-acrylamido-2-methyl-1-propane sulfonic acid) ("PAMPS"), sulfonated poly(ether ether ketone) ("SPEEK"), sulfonated lignin, poly(ethylenesulfonic acid), poly(methacryloxyethylsulfonic acid), their salts, and copolymers thereof; polycarboxylates such as poly(acrylic acid) ("PAA") and poly(methacrylic acid); and sulfates such as carrageenin. Other polyanions include HV-sodium alginate, sodium alginate, sodium hyaluronate, heparin sulfate, cellulose sulfate, kappa carrageenan, pentasodium tripolyphosphate, low-esterified pectin (polygalacturonic acid), polyglutamic acid, carboxymethylcellulose, chondroitin sulfate-6, chondroitin sulfate-4, and collagen. The molecular weight and charge density of the polyanions are selected such that the compounds form polyelectrolyte complexes with a suitable polycation.

Various polyelectrolytes, which are polycations, are also well known to those skilled in the art. Exemplary polycations include polyalkylene imines, such as polyethylene imine ("PEI") and polypropylene imine. Other polycations include polyethylene polyamine, polypropylene polyamine, polyvinylamine, polyallylamine, poly(vinylalcohol/vinylamine), chitosan, polylysine, polymyxin, spermine hydrochloride, protamine sulfate, poly(methylene-co-guanidine) hydrochloride, polyethylenimine-ethoxylated, polyethylenimine-epichlorhydrin modified, quartenized polyamide, and polydiallyidimethyl ammonium chloride-co-acrylamide. Other examples of a positively-charged polyelectrolytes include quaternary ammonium group, such as poly(diallyidimethylammonium chloride) ("PDAD"), poly(vinylbenzyltrimethyl-ammonium) ("PVBTA"), ionenes, poly(acryloxyethyltrimethyl ammonium chloride), poly(methacryloxy(2-hydroxy)propyltrimethyl ammonium chloride), and copolymers thereof; polyelectrolytes comprising a pyridinium group, such as, poly(N-methylvinylpyridine) ("PMVP"), other poly(N-alkylvinylpyridines), and copolymers thereof; and protonated polyamines such as poly(allylaminehydrochloride) ("PAH"). The molecular weight and charge density of the polycations are selected such that the compounds form polyelectrolyte complexes with a suitable polyanions.

Typically, the polyelectrolyte complexes are formed in solution. Thus, in one aspect of the present invention, the polyelectrolytes are water and/or organic soluble, or dispersed in water and/or organic solvent. Most preferably, the solvent is water or brine.

An appropriate solvent is one in which the selected polyelectrolyte is soluble. Thus, the appropriate solvent is dependent upon whether the polyelectrolyte is considered to be hydrophobic or hydrophilic. A hydrophobic polymer displays a less favorable interaction energy with water than a hydrophilic polymer. While a hydrophilic polymer is water soluble, a hydrophobic polymer may only be sparingly soluble in water, or, more likely insoluble in water. Likewise, a hydrophobic polymer is more likely to be soluble in organic solvents than a hydrophilic polymer. In general, the higher the carbon to charge ratio of the polymer, the more hydrophobic it tends to be. For example, poly(vinyl pyridine) alkylated with a methyl group ("PNM4VP") is considered to be hydrophilic, whereas poly(vinyl pyridine) alkylated with an octyl group ("PNO4VP") is considered to be hydrophobic. Thus, water is preferably used as the solvent for hydrophilic polyelectrolytes and organic solvents such as alcohols (e.g., ethanol) are preferably used for hydrophobic polyelectrolytes. Examples of polyelectrolytes used in accordance with this invention that are soluble in water, include poly(styrenesulfonic acid), poly(2-acrylamido-2-methyl-1-propane sulfonic acid), sulfonated lignin, poly(ethylenesulfonic acid), poly(methacryloxyethylsulfonic acid), poly(acrylic acids), poly(methacrylic acids) their salts, and copolymers thereof; as well as poly(diallyidimethylammonium chloride), poly(vinylbenzyltrimethylammonium), ionenes, poly(acryloxyethyltrimethyl ammonium chloride), poly(methacryloxy(2-hydroxy)propyltrimethyl ammonium chloride), and copolymers thereof; and polyelectrolytes comprising a pyridinium group, such as, poly(N-methylvinylpyridine), and protonated polyamines, such as poly(allylamine hydrochloride) and poly(ethyleneimine). Examples of polyelectrolytes that are soluble in non-aqueous solvents, such as ethanol, methanol, dimethylformamide, acetonitrile, carbon tetrachloride, and methylene chloride include poly(N-alkylvinylpyridines), and copolymers thereof, where the alkyl group is longer than about four carbons. Other examples of polyelectrolytes soluble in organic solvents include poly(styrenesulfonic acid), poly(2-acrylamido-2-methyl-1-propane sulfonic acid), poly(diallyidimethylammonium chloride), poly(N-methylvinylpyridine) and poly(ethyleneimine) where the small polymer counterion, for example, $Na^+$, $Cl^-$, $H^+$, has been replaced by a large hydrophobic counterion, such as tetrabutyl ammonium or tetrathethyl ammonium or iodine or hexafluorophosphate or tetrafluoroborate or trifluoromethane sulfonate.

The polyelectrolyte complexes of the present invention may be prepared by providing a stream of uniformly-sized drops of a charged polymer solution in which the particle size of the drops is submicron or at most only a few microns, collecting these droplets in a stirred reactor provided with a polymeric solution of opposite charge, and reacting the droplets and the solution to form the particles. When the drops of polymer are polyanionic and the receiving polymer solution is cationic, the particles have a polyanionic core and a shell or corona of a polyanionic/polycationic complex. The periphery of the particle has an excess positive charge. Conversely, drops of a stream of cationic solution can be collected in a polyanionic solution. These particles have polycationic core and shell of a polycationic/polyanionic complex with an excess of negative charge on the particle periphery.

Alternatively, the polyelectrolyte complexes may be prepared utilizing a mixing device, e.g., microfabricated mixing device, of complex geometry, suitable for laminar flowing. Flow rates may be continuous or may be pulsed. The oscillatory flow of at least one fluid provides increased fluid flow for mixing and improved processing. Thus, the process is scaled-up.

Mixing devices that use multiple, reactant fluid streams with very high mixing energy density and enhanced mixing intimacy of reactants provide fast and controlled reaction chemistry not available from conventional batch reaction technology. U.S. Pat. No. 6,221,332 provides a means to develop and manufacture nanomaterials in a process controllable to the molecular level of mixing. Generally, the micro-fabricated design, in that the system may be scaled-up, provides a much higher throughput, and unlike batch processes, can be operated continuously.

The mixing device may be coupled to a device, such as an autotitrator, which can measure the size or charge density of polyelectrolyte complexes, in real time, within the output of the mixing device, providing for feedback and correction of the chemistry of the reacting streams, in terms of ratio of flow of individual streams, pH of the streams, salt content of the streams and, alternatively, ethanol content, as a de-solvating agent, within one of the streams, in order to control the final output of the process It will be appreciated that some of the polyelectrolytes used in accordance with this invention only become charged at certain pH values. For example, poly(acrylic acids) and derivatives thereof are protonated (uncharged) at pH levels below about 4-6, however, at pH levels of at least about 4-6 the poly(acrylic acid) units ionize and take on a negative charge. Similarly, polyamines and derivatives thereof become charged if the pH of the solution is below about 4. Thus, the pH of the solution may be adjusted in order to optimize the polyelectrolyte complex formation.

The polyelectrolytes typically comprise about 0.01% to 1% by weight of a polyelectrolyte solution, and most preferably about 0.1 to 0.5% by weight. When lower molecular weight compounds are used (e.g., calcium ions), the weight percentage may be higher, for example 5% by weight.

Exemplary polyelectrolyte complexes used for drug delivery are disclosed in Prokop, U.S. Pat. No. 6,726,934 entitled "Micro-Particulate and Nano-Particulate Polymeric Delivery System.," which is incorporated by reference.

The polyelectrolyte gelling agent is added to a solution containing a water-soluble organic polymer. Exemplary polymers are described in Allison et al., U.S. Pat. No. 4,773,481; Dao et al., U.S. Pat. No. 7,091,160; Eoff et al., U.S. Pat. No. 6,476,169; which are incorporated by reference. Examples of the anionic polymers are polyacrylamide and alkylpolyacrylamides, copolymers of polyacrylamide and alkylpolyacrylamides with ethylene, propylene and styrene, polymaleic anhydride and polymethylacrylate and hydrolysis products thereof. The water soluble organic polymers useful in the compositions of this invention can be copolymers, terpolymers, or tetrapolymers, etc.

A preferred water-soluble organic polymer is poly(acrylamide-co-acrylic acid) commercially available as Alcoflood® 935 from Allied Colloids Ltd, England.

Typically, a solution of the water-soluble polymer is pumped into the subterranean formation first, followed by water to displace the water soluble polymer from the well bore to thereby prevent premature gelling upon introduction of the polyelectrolyte gelling agent. Thereafter, the polyelectrolyte gelling agent is pumped into the formation. Alternatively, the water-soluble polymer may be pre-mixed with the polyelectrolyte gelling agent.

The nature of the subterranean formation is not critical to the practice of the process of the present invention. The gel-forming composition can be injected into said subterranean formation having a temperature range of from about 10° C. to about 180° C. Most preferably, said subterranean formation has a temperature in the range of 10° C. to 150° C. It is preferable, however, that the temperature of the gel-forming composition be maintained at elevated temperatures, preferably above 35, 40, 35, 50, or 60° C. Any means known to one skilled in the art such as, for example, pumps, can be used for injecting said gel-forming composition.

The present invention is further illustrated by the following examples that are merely for the purpose of illustration and are not to be regarded as limiting the scope of the invention or manner in which it may be practiced.

EXAMPLE 1

Formation of Nanoparticles Using Polyelectrolyte Complexes

In this example, various nanoparticles comprised of polyelectrolyte complexes were prepared. It will be appreciated that the materials used in this example are for illustrative purposes and are non-limiting.

In this example, chitosan (Mw=15 kDa, 84% deacetylated and Mw=about 100 kDa, 88-93% deacetylated Polysciences, Inc.), dextran sulfate (Mw=500 kDa and Mw=8 kDa, Fisher Scientific), polyethylenimine (Mw=10 kDa, Aldrich), and poly-L-lysine (Mw=10 kDa, Sigma) were used as obtained without further purification. Zinc sulfate heptahydrate (Sigma) was used as a nanoparticle crosslinker in some experiments. Microsep™ centrifugal devices (Pall Life Sciences), dialysis membranes (Spectrum), side-A-lyzer dialysis cassettes (Pierce), and mannitol (Sigma) were used during particle purification.

About 1.6 mL of the appropriate polycationic solution (0.1% w/v) was added dropwise to about 0.8 mL of 1% (w/v) dextran sulfate and stirred for five minutes. For chitosan, a solution pH of about 5.5 (hydrochloric acid) was required to dissolve this material. Finally, about 80 μL of zinc sulfate solution was added and stirred for 30 minutes. The prepared particles were dialyzed against 50 mM phosphate buffer with 5% mannitol for about 24 hours.

The mean particle size was determined by dynamic light scattering experiments (Brookhaven BI-9000AT with BI-200SM goniometer equipped with a helium-neon diode laser operating at 532 nm). An aliquot of lyophilized particles was dissolved in water and each measurement was performed at about 90° C. over a period of about three minutes. The effective diameter was determined by the method of cumulants. The surface charge of the particles was investigated by phase analysis light scattering using a ZetaPALS instrument (Brookhaven Instruments Corp.) equipped with a solid state laser operating at 676 nm. Samples were prepared by dispersing about 5 mg of the lyophilized nanoparticles in about 1 mL of nanopure water and three measurements were taken for each sample. The surface charge was calculated based on Smoluchowski approximation from the electrophoretic mobility of the sample in 50 μm KCl. The morphology of the particles was examined by transmission electron microscopy (JEM-1200EXII, JEOL). The lyophilized particles were dialyzed against nanopure water for about 24 hours using dialysis tubing (MWCO 15,000) to remove mannitol from the sample. Seven microliters of the dialyzed sample along with three microliters of 2% (w/v) phosphotungstate solution was placed on a 300 mesh copper grid with a carbon-coated Formvar membrane. The sample was allowed to sit for about two minutes and then the excess water was removed with a No. 1 Whatman filter paper. The sample was kept in a desiccator overnight and examined by TEM.

Figure 2:
FIG. 2 is a transmission electron microscopy ("TEM") image of DS/CS nanoparticles prepared in accordance with procedures set forth in Example 1.

Dextran sulfate was paired with three polycations (chitosan, polyethylenimine, and poly-L-lysine) to determine the effect of these materials on particle size, polydispersity, and zeta potential. Prior to the work reported, various polyelectrolyte molecular weights and concentrations were screened to determine conditions for most effectively forming nanoparticles around 200 nm. Varying polyelectrolyte molar mass and the mass ratio of polycation to dextran sulfate resulted in direct control over polymer complex diameter and zeta potential including the production of small (about 100 to 300 nm, preferably about 200 nm) complexes. Exemplary data for chitosan paired with dextran sulfate are shown in FIG. 1, and exemplary DS/CS nanoparticles are shown in FIG. 2. The results for polyethylenimine or poly-L-lysine complexed with dextran sulfate were optimized for obtaining particles of about 200 nm in size as shown in the table below:

TABLE 1

Formation of Nanoparticles

| Nanoparticle formulation | Diameter (nm) | Polydispersity | Zeta potential (mV) |
|---|---|---|---|
| Chitosan/DS | 165 ± 17 | 0.26 ± 0.02 | 6.3 ± 6.0 |
| Polyethylenimine/DS | 205 ± 33 | 0.25 ± 0.05 | −6.3 ± 7.3 |
| Poly-L-lysine/DS | 182 ± 24 | 0.01 ± 0.00 | −16.7 ± 8.1 |

A Brookhaven ZetaPALS was used to analyze about 5 mg/mL solutions of the complexes in deionized (DI) water. Increasing polyelectrolyte concentration generally resulted in the formation of a precipitate. In general, the zeta potential of nanoparticle formulations was low and a fairly large standard deviation was noted between preparations.

EXAMPLE 2

Delayed Gel Formation

In this example, the gelation of Alcoflood® 935 solution was investigated when a polyelectrolyte complex was added. More specifically, the stock materials included (1) Alcoflood® 935 (Lot A2247BOV), 20,000 ppm, 4% NaCl, 20 ppm NaN$_3$ aqueous solution; (2) polyethyleneimine ("PEI") aqueous solution, 9,997 ppm; and (3) dextran sulfate ("DS") aqueous solution, 9,991 ppm. First, a solution comprising 9,997 ppm PEI (100.63 g) was formed, and a separate solution comprising the 9,991 ppm DS (46.94 g) was formed. A polyelectrolyte complex solution was prepared by mixing the two solutions together. Then, the polyelectrolyte solution was mixed with varying amounts of the Alcoflood® 935 as set forth in Table 2. All samples were maintained at 40° C., with the exception of sample 6, which was maintained at about 23° C. The pH of the solution was generally around 10. The composition of each sample is set forth in Table 2:

TABLE 2

PEI/DS Polyelectrolyte and Alcoflood Gelling Composition

| Sample No. | Mass of Alcoflood 935 (g) | Mass PEI/DS Nano Solution (g) | Water Added (g) | Total Mass Soln (g) | Final Alcoflood Concentration (ppm) | Percentage of Nano Solution (%) |
|---|---|---|---|---|---|---|
| G1 | 3.995 | 12.002 | 0 | 15.997 | 4995 | 75.03 |
| G2 | 3.743 | 8.917 | 2.266 | 14.926 | 5015 | 59.7 |
| G3 | 4.005 | 7.233 | 4.808 | 16.046 | 4992 | 45.1 |
| G4 | 3.756 | 4.444 | 6.736 | 14.936 | 5029 | 29.8 |
| G5 | 1.994 | 7.159 | 6.809 | 15.962 | 2498 | 44.8 |
| G6 | 3.989 | 11.988 | 0 | 15.997 | 4987 | 74.9 |
| G7 | 0 | 16.619 | 0 | 16.919 | 0 | 100 |
| G8 | 3.742 | 0 | 11.236 | 14.978 | 5007 | 0 |

Figure 3:
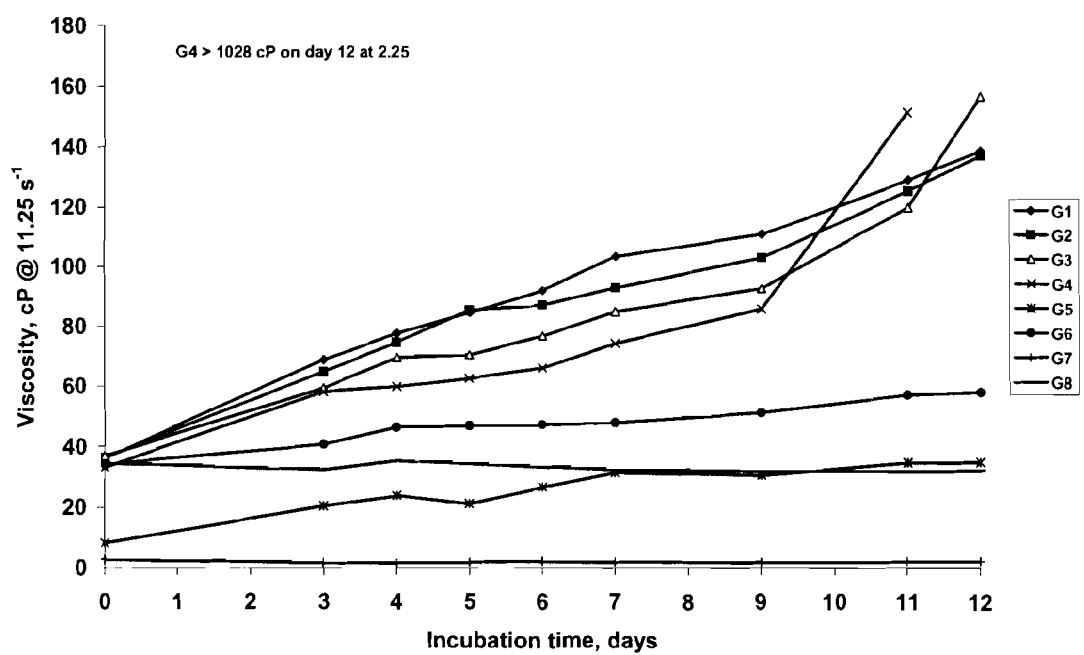
FIG. 3 illustrates the effectiveness of several polyelectrolyte complexes in delaying the gelation of an Alcoflood® 935 solution by measuring the viscosity as a function of time.

A Brookfield Digital Viscometer Model LVDV-1+cP was used to monitor the viscosity changes of gelant and control solutions and determine the gel time of the gelant solutions. The gelation process was monitored as a function of time starting from the point of visual homogeneous dispersion. At a shear rate of 11.25 s$^{-1}$, the maximum viscosity that can be measured is 205.6 cP. Thus, the gelation time based on a shear rate of 11.25 s$^{-1}$ was defined as the time when the viscosity of the gel solution increases abruptly to a value greater than 205.6 cP. Table 3 and FIG. 3 show viscosity (cP) changes as a function of time (days) for the evaluated samples.

TABLE 3

Viscosity Changes for PEI/DS and Alcoflood Formulations at 11.25 s$^{-1}$
Day and Viscosity (cP)

| Sample | 0 | 3 | 4 | 5 | 6 | 7 | 9 | 11 | 12 |
|---|---|---|---|---|---|---|---|---|---|
| G1 | 36 | 68.9 | 77.5 | 84.6 | 91.8 | 103.2 | 110.8 | 128.8 | 138.4 |
| G2 | 36.2 | 65 | 74.4 | 85.4 | 86.9 | 92.8 | 102.8 | 125.1 | 136.9 |
| G3 | 36.8 | 59.5 | 69.5 | 70.5 | 76.6 | 84.8 | 92.6 | 119.6 | 156.3 |
| G4 | 33.1 | 58.3 | 59.9 | 62.7 | 66 | 74.2 | 85.8 | 151.2 | GEL |
| G5 | 8.18 | 20.4 | 23.7 | 21.1 | 26.4 | 31.3 | 30.5 | 34.7 | 34.7 |
| G6 | 34.1 | 40.7 | 46.4 | 46.8 | 47.2 | 47.8 | 51.3 | 57.2 | 58.2 |
| G7 | 2.66 | 1.64 | 1.43 | 1.84 | 2.04 | 1.84 | 1.74 | 2.25 | 2.25 |
| G8 | 34.5 | 32.3 | 35.2 | 34.3 | 33.3 | 32.3 | 31.9 | 31.9 | 31.9 |

The data clearly shows that the polyelectrolyte complexes were successful at delaying gelation of the Alcoflood®. In particular, sample G4 (comprised of 5015 ppm Alcoflood® and 29.8% of the PEI/DS nanoparticles solution produced a gel after 12 incubation days. The viscosity evolution further indicates that Samples G1, G2, and G3 will gel within the next few days. This is in marked contrast to the Comparative Example 2 of Allison et al., U.S. Pat. No. 4,773,481.

EXAMPLE 3

Delayed Gel Formation

In this example, the gelation of Alcoflood® 935 solution was investigated when a polyelectrolyte complex was added. More specifically, the stock materials included (1) Alcoflood® 935 (Lot A2247BOV), 10,000 ppm, 2% NaCl, 10 ppm NaN$_3$ aqueous solution; (2) polyethyleneimine ("PEI") aqueous solution, 9,997 ppm; and (3) dextran sulfate ("DS") aqueous solution, 9,991 ppm. A polyelectrolyte complex solution was prepared by mixing 100.63 g of the PEI solution (9997 ppm) and the 46.94 g DS solution (9991 ppm). Then, the polyelectrolyte solution was mixed with varying amounts of the Alcoflood® 935. All samples were maintained at 40° C., with the exception of sample 6, which was maintained at about 23° C. The pH was around 10 or 11, but it is anticipated that longer gelation times can be obtained by lowering the pH. The composition of each sample is set forth in Table 4:

TABLE 4

PEI/DS Polyelectrolyte and Alcoflood Gelling Composition

| Sample No. | Mass of Alcoflood 935 (g) | Mass of PEI/DS Nano Solution (g) | Water Added (g) | Total Mass Soln (g) | Final Alcoflood Concentration (ppm) | Percentage of Nano Solution (%) | Initial pH |
|---|---|---|---|---|---|---|---|
| H1 | 7.513 | 7.556 | 0 | 15.069 | 4986 | 50.1 | 10.97 |
| H2 | 7.511 | 5.956 | 1.531 | 14.998 | 5008 | 39.7 | 10.97 |
| H3 | 7.503 | 4.53 | 3.001 | 15.034 | 4991 | 30.1 | 10.89 |
| H4 | 7.498 | 2.994 | 4.496 | 14.988 | 5003 | 19.98 | 10.84 |
| H5 | 2.998 | 4.474 | 7.509 | 14.981 | 2001 | 29.9 | 11.1 |
| H6 | 7.51 | 7.562 | 0 | 15.072 | 4983 | 50.2 | 10.96 |
| H7 | 0 | 15.017 | 0 | 15.017 | 0 | 100 | 11.59 |
| H8 | 7.495 | 0 | 7.498 | 14.993 | 4999 | 0 | 6.93 |

Figure 4:
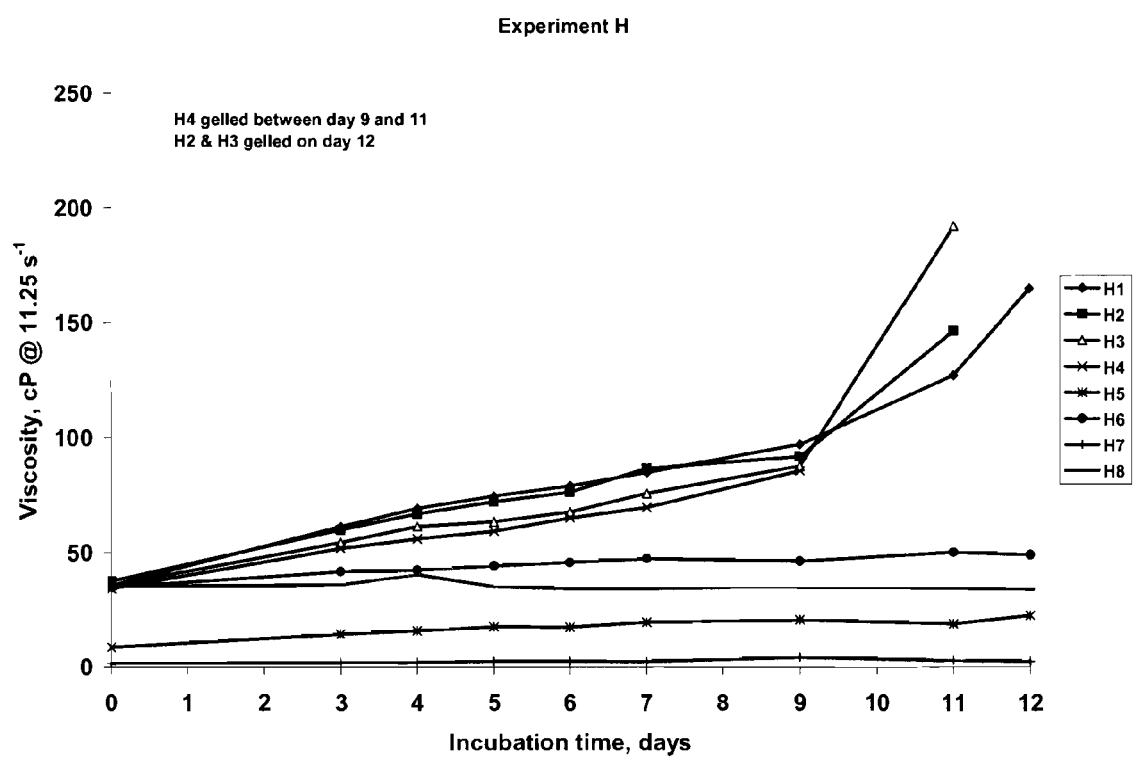
FIG. 4 illustrates the results of a second experiment showing the effectiveness of several polyelectrolyte complexes in delaying the gelation of an Alcoflood® 935 solution by measuring the viscosity as a function of time.

A Brookfield Digital Viscometer Model LVDV-1+cP was used to monitor the viscosity changes of gelant and control solutions and determine the gel time of the gelant solutions. The gelation process was monitored as a function of time starting from the point of visual homogeneous dispersion. The gelation time was defined as the time when the viscosity of the gel solution increases abruptly to a value greater than 205.6 cP, the maximum viscosity that can be measured at a shear rate of 11.25 s$^{-1}$. Table 5 and FIG. 4 show viscosity (cP) changes as a function of time (days) for the evaluated samples.

TABLE 5

Viscosity Changes for PEI/DS and Alcoflood ® Formulation at 11.25 s$^{-1}$
Day and Viscosity (cP)

| Sample No. | 0 | 3 | 4 | 5 | 6 | 7 | 9 | 11 | 12 |
|---|---|---|---|---|---|---|---|---|---|
| H1 | 35.6 | 61.3 | 69.1 | 74.4 | 78.9 | 84.6 | 96.9 | 127.1 | 164.7 |
| H2 | 37.6 | 59.9 | 66.8 | 71.9 | 76.2 | 84.6 | 91.6 | 146.3 | GEL |
| H3 | 35.6 | 54 | 61.3 | 63.4 | 67.6 | 75.6 | 87.5 | 191.9 | GEL |
| H4 | 34.3 | 51.9 | 56 | 59.3 | 65 | 69.5 | 85.4 | GEL | GEL |
| H5 | 8.58 | 14.3 | 15.7 | 17.4 | 17.2 | 19.4 | 20.4 | 18.8 | 22.5 |
| H6 | 34.9 | 41.7 | 42.3 | 43.9 | 45.4 | 47 | 46 | 49.9 | 48.8 |
| H7 | 1.43 | 1.84 | 1.84 | 2.45 | 2.45 | 2.25 | 4.29 | 2.86 | 2.25 |
| H8 | 35.2 | 36 | 40.1 | 34.9 | 33.9 | 33.9 | 34.9 | 34.3 | 33.9 |

The data clearly shows that the polyelectrolyte complexes were successful at delaying gelation of the Alcoflood®. In particular, sample H4 gelled between day 9 and day 11, followed closely by H2 and H3 on day 12. In addition, the viscosity evolution further indicates that Sample H1 will gel in the next few days. This is in marked contrast to rapid gelation of the Comparative Example 2 of Allison et al., U.S. Pat. No. 4,773,481.

From the foregoing it will be seen that this invention is one well adapted to attain all ends and objectives herein-above set forth, together with the other advantages which are obvious and which are inherent to the invention. Since many possible embodiments may be made of the invention without departing from the scope thereof, it is to be understood that all matters herein set forth or shown in the accompanying drawings are to be interpreted as illustrative, and not in a limiting sense. Further, while specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. A method of reducing the permeability of a subterranean zone comprising the steps of:
   forming an aqueous composition comprised of water, a polyelectrolyte gelling agent comprising a polyanion complexed with a polycation, and a water soluble polymer capable of being cross-linked by said polyelectrolyte gelling agent in said zone; and
   allowing said aqueous composition to form a cross-linked gel in said zone.

2. The method of claim 1 wherein said polycation of said polyelectrolyte gelling agent is capable of cross-linking said water soluble polymer.

3. The method of claim 2 wherein said water soluble polymer is a copolymer of an ethylenically unsaturated polar monomer and an ethylenically unsaturated ester.

4. The method of claim 3 wherein said ethylenically unsaturated polar monomer in said copolymer is acrylamide.

5. The method of claim 1 wherein said polycation is a polyalkylene imine.

6. The method of claim 5 wherein said polyalkylene imine is selected from the group consisting of polyethylene imine and polypropylene imine.

7. The method of claim 1 wherein said polyanion comprises dextran sulfate.

8. The method of claim 1 wherein said polycation is selected from the group consisting of chitosan, polyethylenimine, poly-L-lysine and said polyanion comprises dextran sulfate.

9. The method of claim 1 wherein said polyelectrolyte gelling agent further comprises a monovalent or bivalent cation selected from the group consisting of sodium ion or calcium ion.

10. The method of claim 1 wherein said polyelectrolyte gelling agent further comprises an anion selected from the group consisting of triphosphate ion, chloride ion, or sulfate ion.

11. The method of claim 1 wherein said polyelectrolyte gelling agent comprises a nanoparticle with a particle size of about 100 to 300 nm in diameter.

12. The method of claim 1 wherein said cross-linked gel in said zone forms after about 11 days.

13. The method of claim 1 wherein said water soluble polymer is introduced into said zone followed by introduction of the polyelectrolyte gelling agent.

14. The method of claim 1 wherein said polyanion of said polyelectrolyte gelling agent is capable of cross-linking said water soluble polymer.

15. A composition for reducing the permeability of a subterranean formation or zone comprising:
   water;
   a water soluble organic polymer;
   a polyelectrolyte gelling agent comprising a polycation complexed with a polyanion; said polyelectrolyte gelling agent capable of cross-linking said water soluble organic polymer.

16. The composition of claim 15 wherein said wherein said polycation is selected from the group consisting of chitosan, polyalkylene imine, poly-L-lysine, and said polyanion comprises dextran sulfate.

17. The composition of claim 15 wherein said polyelectrolyte gelling agent further comprises a cation selected from the group consisting of sodium ion or calcium ion.

18. The composition of claim 15 wherein said wherein said polyelectrolyte gelling agent further comprises an anion selected from the group consisting of triphosphate ion, chloride ion, or sulfate ion.

19. The composition of claim 15 wherein said polyelectrolyte gelling agent comprises nanoparticles ranging from about 100 to 300 nm in diameter.

20. The composition of claim 15 wherein said water soluble polymer is a copolymer of an ethylenically unsaturated polar monomer and an ethylenically unsaturated ester.

21. The composition of claim 20 wherein said ethylenically unsaturated polar monomer in said copolymer is acrylamide.

22. The composition of claim 15 wherein said polyelectrolyte gelling agent consists essentially of a polycation complexed with a polyanion.

23. The composition of claim 15 wherein said polyelectrolyte gelling agent consists of a polycation complexed with a polyanion.

24. The composition of claim 15 wherein said polycation of said polyelectrolyte gelling agent is capable of cross-linking said water soluble polymer.

25. The composition of claim 15 wherein said polycation is a polyalkylene imine.

26. The composition of claim 25 wherein said polyalkylene imine is selected from the group consisting of polyethylene imine and polypropylene imine.

27. The composition of claim 15 wherein said polyanion comprises dextran sulfate.

28. The composition of claim 15 wherein said polyanion of said polyelectrolyte gelling agent is capable of cross-linking said water soluble polymer.

* * * * *